United States Patent
Nemoto

(10) Patent No.: US 12,434,621 B2
(45) Date of Patent: Oct. 7, 2025

(54) VEHICLE LAMP

(71) Applicant: TOYOTA JIDOSHA KABUSHIKI KAISHA, Toyota (JP)

(72) Inventor: Kakeru Nemoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 18/534,715

(22) Filed: Dec. 11, 2023

(65) Prior Publication Data
US 2024/0262284 A1    Aug. 8, 2024

(30) Foreign Application Priority Data

Feb. 7, 2023 (JP) ................... 2023-017207

(51) Int. Cl.
| | |
|---|---|
| B60Q 1/14 | (2006.01) |
| B60Q 1/00 | (2006.01) |
| H05B 45/56 | (2020.01) |
| H05B 47/11 | (2020.01) |
| H05B 47/17 | (2020.01) |

(52) U.S. Cl.
CPC .......... B60Q 1/143 (2013.01); B60Q 1/0023 (2013.01); H05B 45/56 (2020.01); H05B 47/11 (2020.01); H05B 47/17 (2020.01); *B60Q 2300/314* (2013.01)

(58) Field of Classification Search
CPC .......... B60Q 1/143; B60Q 1/0023; B60Q 2300/314; B60Q 11/00; H05B 45/56; H05B 47/11; H05B 47/17; H05B 45/18
See application file for complete search history.

(56) References Cited

U.S. PATENT DOCUMENTS

| | | |
|---|---|---|
| 5,382,877 A | 1/1995 | Katsumata et al. |
| 11,089,664 B1 * | 8/2021 | Price ...................... H05B 45/56 |
| 2004/0179368 A1 | 9/2004 | Takeda et al. |
| 2018/0242421 A1 | 8/2018 | Ohta et al. |
| 2020/0108766 A1 | 4/2020 | Shibata |
| 2020/0150658 A1 | 5/2020 | Ueda |

(Continued)

FOREIGN PATENT DOCUMENTS

| | | |
|---|---|---|
| JP | H05-262180 A | 10/1993 |
| JP | 2004-276738 A | 10/2004 |
| JP | 2005-096550 A | 4/2005 |

(Continued)

*Primary Examiner* — Renan Luque
(74) *Attorney, Agent, or Firm* — SOLARIS Intellectual Property Group, PLLC

(57) ABSTRACT

A vehicle lamp that includes: a light source that emits light due to a drive current that is supplied from a light source drive circuit; and a temperature sensor that measures a temperature of the light source or surroundings of the light source, wherein the light source drive circuit reduces the drive current when the temperature that has been measured by the temperature sensor becomes equal to or greater than a control start temperature, and, in a case in which an illuminance of surroundings of a vehicle that has been measured by an illuminance measurement sensor is equal to or greater than an illuminance threshold, the control start temperature is set to be lower than in a case in which the illuminance of the surroundings of the vehicle is less than the illuminance threshold.

4 Claims, 5 Drawing Sheets

(56) References Cited

U.S. PATENT DOCUMENTS

2021/0153314 A1* 5/2021 Ichikawa .............. H05B 45/38
2024/0015866 A1* 1/2024 Nakayama ............ H05B 45/50

FOREIGN PATENT DOCUMENTS

| JP | 2014-159248 A | 9/2014 |
| JP | 2017-196983 A | 11/2017 |
| JP | 2018-134981 A | 8/2018 |
| JP | 2019-055695 A | 4/2019 |
| JP | 2020-080112 A | 5/2020 |
| JP | 2022-136305 A | 9/2022 |

* cited by examiner

VEHICLE LAMP

CROSS-REFERENCE TO RELATED APPLICATION

This application is based on and claims priority under 35 USC 119 from Japanese Patent Application No. 2023-017207, filed on Feb. 7, 2023, the disclosure of which is incorporated by reference herein.

BACKGROUND

Technical Field

The present disclosure relates to a vehicle lamp.

Related Art

Japanese Patent Application Laid-Open (JP-A) No. 2018-134981 discloses technology having a configuration in which a light-emitting element emits light by receiving supply of a drive current from a current supply device, a temperature sensor performs temperature detection at a position closer to the light-emitting element than the current supply device, and a signal generation section outputs a control signal to the current supply device in order to control the drive current according to a detection value of the temperature sensor, wherein, in a case in which the temperature detected by the temperature sensor is equal to or greater than a predetermined temperature, derating control is performed so as to reduce the drive current according to the temperature.

SUMMARY

An aspect of the present disclosure is a vehicle lamp that includes: a light source that emits light due to a drive current that is supplied from a light source drive circuit; and a temperature sensor that measures a temperature of the light source or surroundings of the light source, wherein the light source drive circuit reduces the drive current when the temperature that has been measured by the temperature sensor becomes equal to or greater than a control start temperature, and, in a case in which an illuminance of surroundings of a vehicle that has been measured by an illuminance measurement sensor is equal to or greater than an illuminance threshold, the control start temperature is set to be lower than in a case in which the illuminance of the surroundings of the vehicle is less than the illuminance threshold.

DETAILED DESCRIPTION

Figure 1:
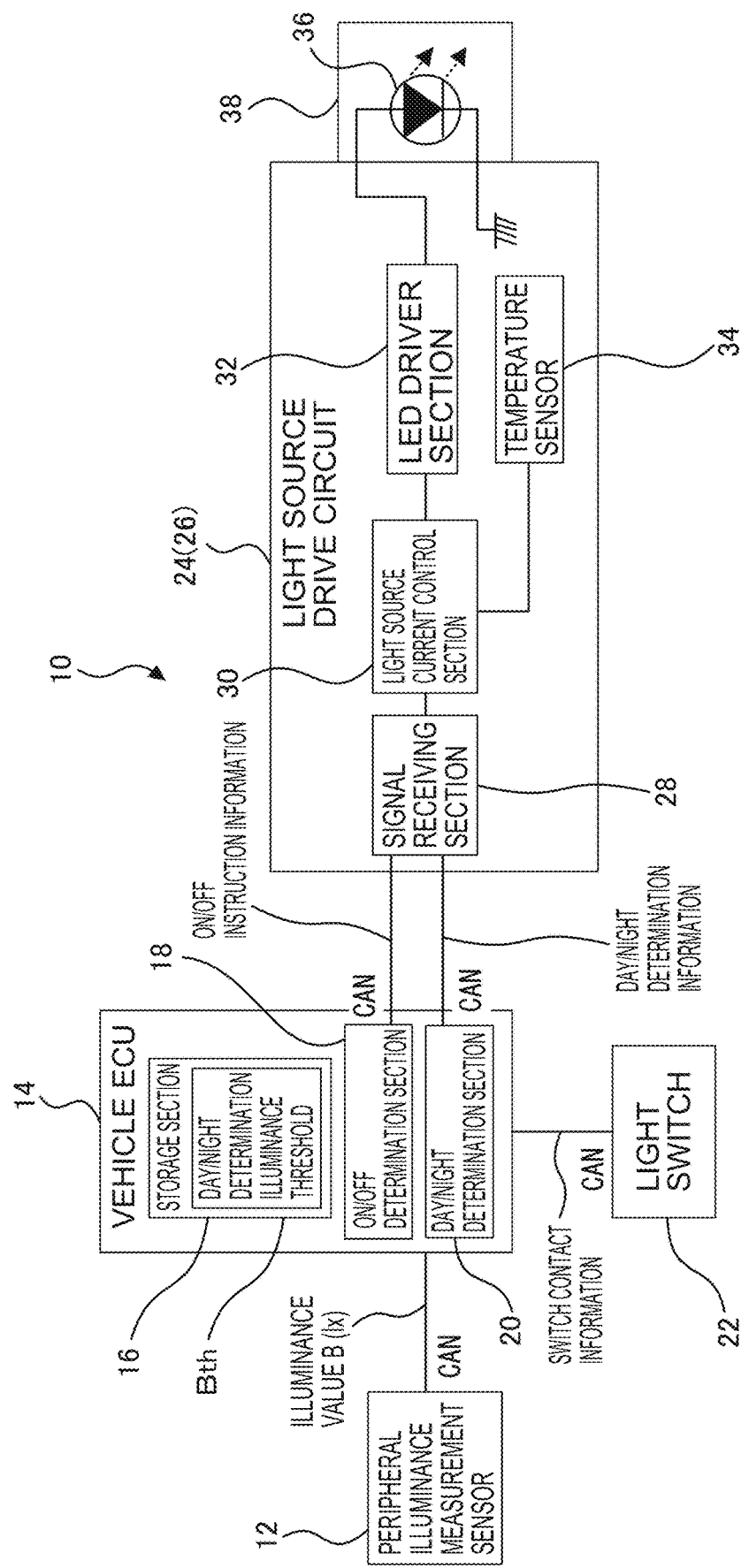
FIG. 1 is a block diagram illustrating an example of a schematic configuration of a vehicle lamp system according to an exemplary embodiment.

An example of an exemplary embodiment of the present disclosure will be explained in detail below with reference to the drawings. A vehicle lamp system 10 illustrated in FIG. 1 is installed at a vehicle, and includes a peripheral illuminance measurement sensor 12, a vehicle electronic control unit (ECU) 14, a light source drive circuit 24, and an LED light source 36. The vehicle lamp system 10 is an example of a vehicle lamp according to the present disclosure.

It should be noted that, in the present exemplary embodiment, although an aspect in which the LED light source 36 is provided as a low beam light source among headlamps of a vehicle will be explained, the LED light source 36 may be a high beam light source among headlamps of a vehicle, or may be a light source for another lamp such as a tail lamp or the like of a vehicle.

The peripheral illuminance measurement sensor 12 measures an illuminance of surroundings of the vehicle. In the present exemplary embodiment, an illuminance sensor provided at the vehicle for performing auto light (also referred to as control light) control to turn on and off the headlamps of the vehicle according to the illuminance around the vehicle, or a camera provided at the vehicle for imaging the surroundings of the vehicle, may be used as the peripheral illuminance measurement sensor 12. The peripheral illuminance measurement sensor 12 is connected to the vehicle ECU 14 via a communication line (such as, for example, a controller area network (CAN) bus), and outputs an illuminance measurement value B of the surroundings of the vehicle to the vehicle ECU 14. The peripheral illuminance measurement sensor 12 is an example of an illuminance measurement sensor of the present disclosure.

The vehicle ECU 14 includes a non-volatile storage section 16 such as a hard disk drive (HDD), a solid state drive (SSD) or the like, which is a non-transitory recording medium. The storage section 16 is an example of a memory. The storage section 16 stores a first program for causing the vehicle ECU 14 to function as an on/off determination section 18, and a second program for causing the vehicle ECU 14 to function as a day/night determination section 20, and further stores a day/night determination illuminance threshold Bth. It should be noted that, when the vehicle is shipped, a value corresponding to a destination of the vehicle is set and stored as the day/night determination illuminance threshold Bth stored in the storage section 16. The vehicle ECU 14 is an example of a processor, and functions as, for example, the on/off determination section 18, the day/night determination section 20, and the like by loading and executing programs.

A light switch 22 is connected to the vehicle ECU 14 via a communication line such as a CAN bus or the like. The light switch 22 is provided with plural contacts including a first contact that instructs execution of auto light control to turn on and off a low beam of the vehicle according to the illuminance measurement value B of the surroundings of the vehicle, and a second contact that turns on the low beam of the vehicle regardless of the illuminance measurement value B of the surroundings of the vehicle. The light switch 22 is operated by an occupant of the vehicle to thereby turn on any one of the plural contacts and output switch contact information indicating which of the contacts is on to the vehicle ECU 14.

Based on the switch contact information input from the light switch 22, in a case in which a contact other than the first contact of the light switch 22 is on, the on/off determination section 18 determines whether the low beam of the headlamps of the vehicle should be turned on or should be turned off according to the contact that is turned on, and outputs a determination result to the light source drive circuit 24 as on/off instruction information. It should be noted that, in a case in which the second contact of the light switch 22 is on, on/off instruction information that causes the low beam of the vehicle to be turned on is output even if the illuminance measurement value B of the surroundings of the vehicle is equal to or greater than a predetermined illuminance threshold (which will be described later).

Further, in a case in which the first contact of the light switch 22 is on, the on/off determination section 18 compares the illuminance measurement value B of the surroundings of the vehicle that has been input from the peripheral illuminance measurement sensor 12 with the predetermined illuminance threshold, and the on/off determination section 18 determines to turn off the low beam if the illuminance measurement value B is equal to or greater than the predetermined illuminance threshold, and determines to turn on the low beam if the illuminance measurement value B is less than the predetermined illuminance threshold. The determination result is then output to the light source drive circuit 24 as the on/off instruction information. It should be noted that the predetermined illuminance threshold in the above processing may be the same value as the day/night determination illuminance threshold Bth stored in the storage section 16, or may be a value that is different from the day/night determination illuminance threshold Bth.

On the other hand, the day/night determination section 20 compares the illuminance measurement value B of the surroundings of the vehicle that has been input from the peripheral illuminance measurement sensor 12 with the day/night determination illuminance threshold Bth, and the day/night determination section 20 determines that it is daytime if the illuminance measurement value B is equal to or greater than the day/night determination illuminance threshold Bth, and determines that it is nighttime if the illuminance measurement value B is less than the day/night determination illuminance threshold Bth. The determination result is then output to the light source drive circuit 24 as day/night determination information.

The light source drive circuit 24 includes a signal receiving section 28, a light source current control section 30, an LED driver section 32, and a temperature sensor 34, and these are respectively mounted at a first substrate 26. The signal receiving section 28 receives the on/off instruction information from the on/off determination section 18 of the vehicle ECU 14, receives the day/night determination information from the day/night determination section 20 of the vehicle ECU 14, and outputs the on/off instruction information and the day/night determination information that have been received, to the light source current control section 30.

Further, the temperature sensor 34 is provided at a portion on the substrate of the first substrate 26 where the temperature rises during lighting of the LED light source 36 (such as, for example, in the vicinity of the LED driver section 32), and the temperature sensor 34 measures a substrate temperature T, which is an example of a temperature of surroundings of the LED light source 36, and outputs the measured substrate temperature T to the light source current control section 30. It should be noted that the temperature sensor 34 may be mounted at a second substrate 38 at which the LED light source 36 is mounted, and, for example, may be provided so as to be in contact with the LED light source 36 and configured so as to directly measure the temperature of the LED light source 36.

The light source current control section 30 controls turning on/off of a drive current supplied from the LED driver section 32 to the LED light source 36 so that the LED light source 36 is turned on/off according to the on/off instruction information that has been input from the signal receiving section 28. Further, during lighting of the LED light source 36, the light source current control section 30 compares the substrate temperature T that has been input from the temperature sensor 34 with a predetermined control start temperature, and performs derating control so as to reduce the drive current supplied from the LED driver section 32 to the LED light source 36 when the substrate temperature T is equal to or greater than the control start temperature.

Moreover, based on the day/night determination information that has been input from the signal receiving section 28, in a case in which the illuminance of the surroundings of the vehicle is equal to or greater than the illuminance threshold (in a case in which the day/night determination result is "daytime"), the light source current control section 30 lowers the control start temperature of the derating control more than in a case in which the illuminance of the surroundings of the vehicle is less than the illuminance threshold (more than in a case in which the day/night determination result is "nighttime"). It should be noted that the light source current control section 30 is an example of a control section of the present disclosure.

The LED driver section 32 is connected to the LED light source 36 mounted at the second substrate 38, and supplies a drive current to the LED light source 36 according to an instruction from the light source current control section 30. It should be noted that the LED driver section 32 is an example of a current supply section of the present disclosure. The LED light source 36 emits light due to the drive current supplied from the LED driver section 32.

Figure 2:
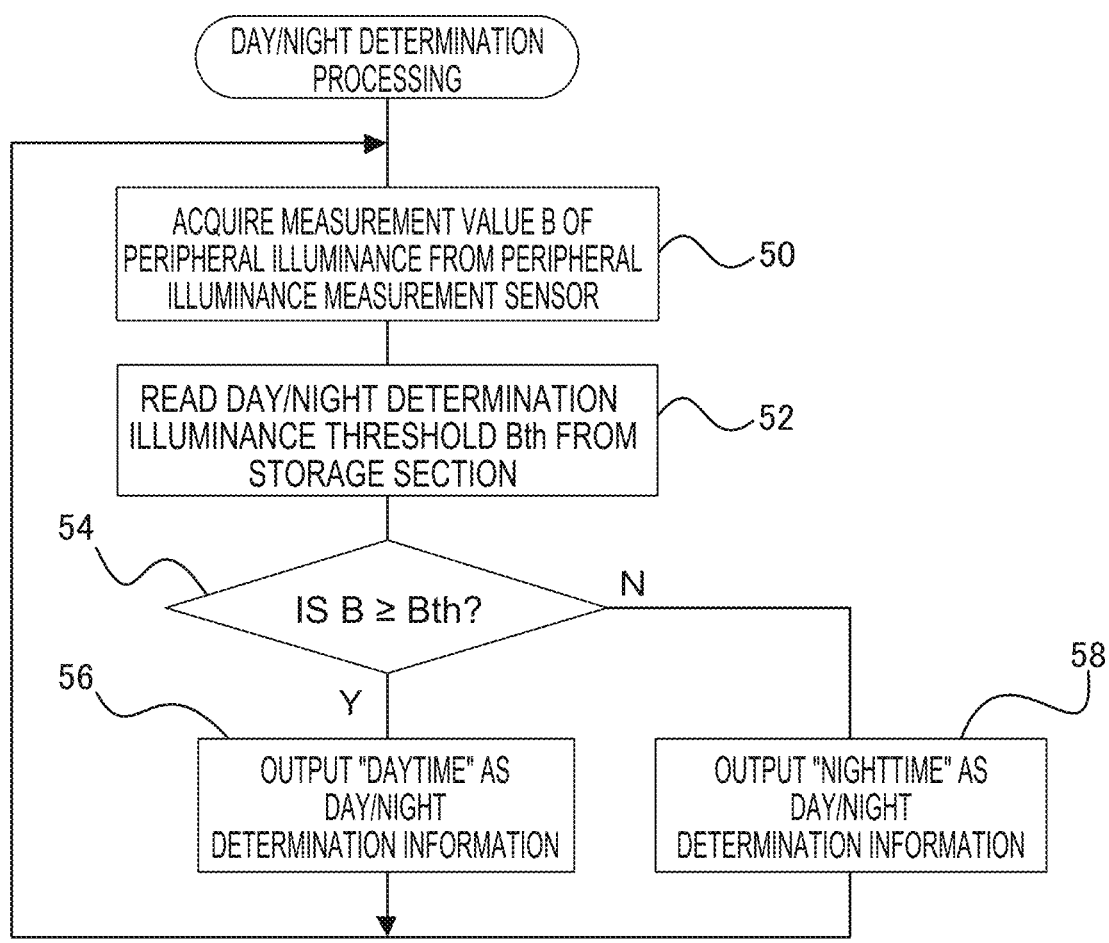
FIG. 2 is a flowchart illustrating an example of day/night determination processing executed by a vehicle ECU.

Next, as operation of the present exemplary embodiment, day/night determination processing that is executed by the day/night determination section 20 of the vehicle ECU 14 while an ignition switch of the vehicle is on will first be explained with reference to FIG. 2.

At step 50 of the day/night determination processing, the day/night determination section 20 acquires the illuminance measurement value B from the peripheral illuminance measurement sensor 12. At step 52, the day/night determination section 20 reads the day/night determination illuminance threshold Bth from the storage section 16. At step 54, the day/night determination section 20 then determines whether or not the illuminance measurement value B that has been acquired from the peripheral illuminance measurement sensor 12 at step 50 is equal to or greater than the day/night determination illuminance threshold Bth that has been read from the storage section 16 at step 52.

In a case in which the determination of step 54 is affirmative, the processing transitions to step 56, and at step 56, the day/night determination section 20 outputs information indicating that the peripheral illuminance is a value corresponding to "daytime" to the light source drive circuit 24 as the day/night determination information. When the processing of step 56 has been performed, the processing returns to step 50. Further, in a case in which the determination of step 54 is negative, the processing transitions to step 58, and at step 58, the day/night determination section 20 outputs information indicating that the peripheral illuminance is a value corresponding to "nighttime" to the light source drive circuit 24 as the day/night determination information. When the processing of step 58 has been performed, the processing returns to step 50.

It should be noted that, although the day/night determination information is periodically output from the vehicle ECU 14 to the light source drive circuit 24 in the day/night determination processing described above, the present disclosure is not limited thereto, and a configuration may be provided such that the day/night determination information is output from the vehicle ECU 14 to the light source drive circuit 24 only in a case in which the peripheral illuminance has changed from "daytime" to "nighttime" and in a case in which the peripheral illuminance has changed from "nighttime" to "daytime".

Figure 3:
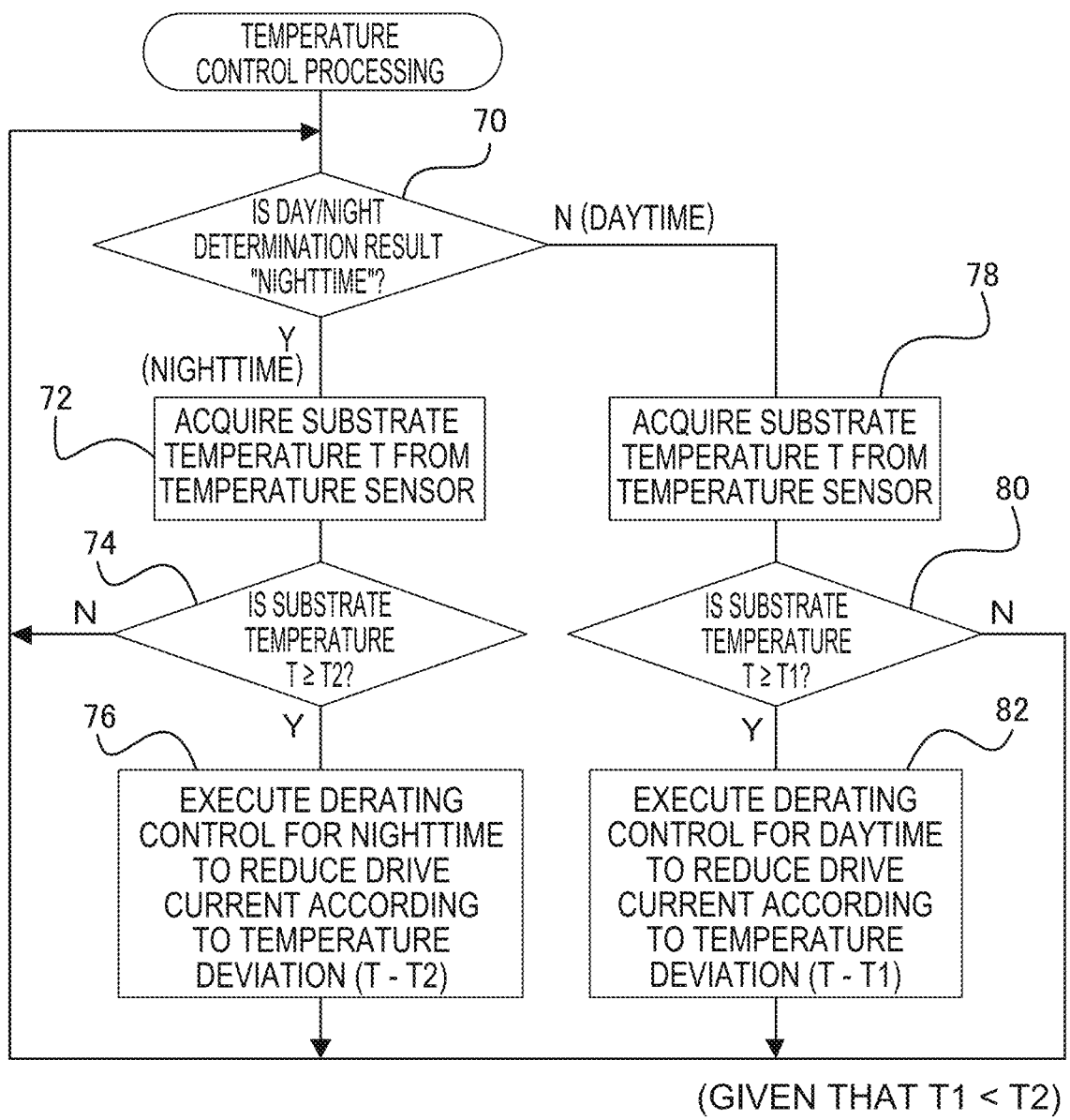
FIG. 3 is a flowchart illustrating an example of temperature control processing executed by a light source current control section.

Next, temperature control processing executed by the light source current control section 30 of the light source drive circuit 24 while the ignition switch of the vehicle is on will be explained with reference to FIG. 3.

At step 70 of the temperature control processing, the light source current control section 30 refers to the day/night determination information that has been input from the day/night determination section 20 via the signal receiving section 28, and determines whether or not the day/night determination result by the day/night determination section 20 is "nighttime". In a case in which the determination of step 70 is affirmative, the processing transitions to step 72.

At step 72, the light source current control section 30 acquires the substrate temperature T from the temperature sensor 34. Further, at step 74, the light source current control section 30 determines whether or not the substrate temperature T is equal to or greater than a control start temperature T2 (also refer to FIG. 4) in derating control for nighttime. In a case in which the determination of step 74 is negative, the processing returns to step 70 without performing any processing.

Figure 4:
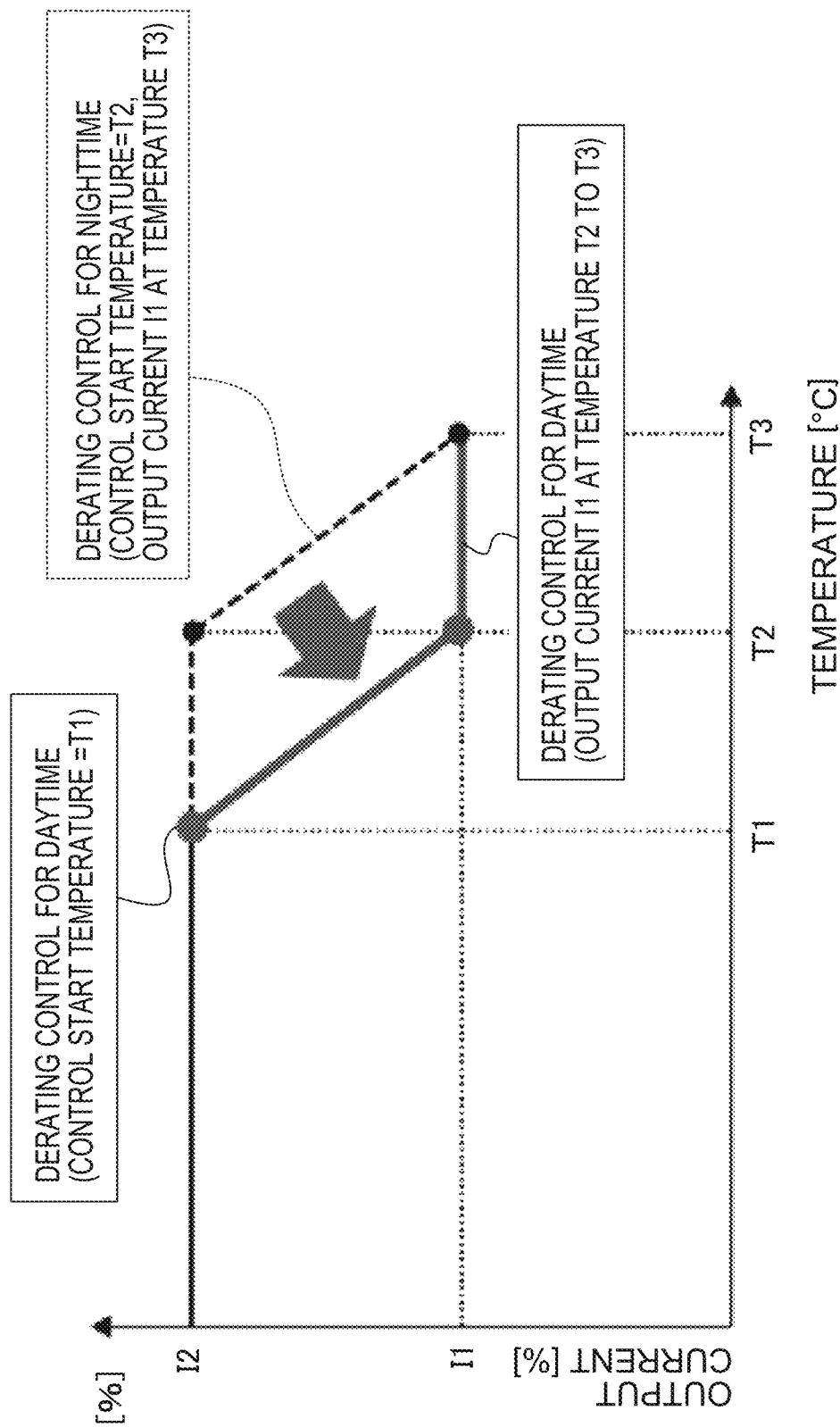
FIG. 4 is a diagram illustrating an example of a relationship between a light source temperature and an output current.

In a case in which the determination of step 74 is affirmative, the processing transitions to step 76, and at step 76, the light source current control section 30 executes the derating control for nighttime to reduce the drive current of the LED light source 36 according to a temperature deviation (T−T2). As illustrated in FIG. 4, in the derating control for nighttime, the control start temperature is T2, and the drive current is reduced linearly with respect to an increase in the substrate temperature T so that, when the substrate temperature T has risen to a temperature T3, the output current to the LED light source 36 drops from I2 to I1. When the processing of step 76 is ended, the processing returns to step 70.

However, in a case in which the derating control is performed at nighttime, an amount of light of a luminous flux emitted from the LED light source 36 is reduced, resulting in deterioration of a forward field of view. Accordingly, in the present exemplary embodiment, the control start temperature T2 of the derating control for nighttime is set at a high temperature so as not to be reached at nighttime.

Further, in a case in which the day/night determination result by the day/night determination section 20 is "daytime", the determination of step 70 is negative, and the processing transitions to step 78. At step 78, the light source current control section 30 acquires the substrate temperature T from the temperature sensor 34. Further, at step 80, the light source current control section 30 determines whether or not the substrate temperature T is equal to or greater than the control start temperature T1 in derating control for daytime. It should be noted that, as illustrated in FIG. 4, the control start temperature T1 in derating control for daytime is set to be lower than the control start temperature T2 in derating control for nighttime. In a case in which the determination of step 80 is negative, the processing returns to step 70 without performing any processing.

Further, in a case in which the determination of step 80 is affirmative, the processing transitions to step 82, and at step 82, the light source current control section 30 executes derating control for daytime to reduce the drive current of the LED light source 36 according to the temperature deviation (T−T1). As illustrated in FIG. 4, in the derating control for daytime, the control start temperature is T1, and the drive current is reduced linearly with respect to an increase in the substrate temperature T so that, when the substrate temperature T has risen to the temperature T2, the output current to the LED light source 36 drops from I2 to I1.

As described above, since the control start temperature T1 in the derating control for daytime is set to be lower than the control start temperature T2 in the derating control for nighttime, the derating control is started earlier during daytime when the LED light source 36 and peripheral members thereof are in a thermally severe environment. Consequently, the temperature of the LED light source 36 and peripheral members thereof can be kept low, and therefore, thermal degradation of the LED light source 36 and peripheral components thereof can be suppressed. Further, in a case in which derating control is performed during daytime, a decrease in the amount of light of the luminous flux emitted from the LED light source 36 does not adversely affect the forward field of view. Then, when the processing of step 82 is ended, the processing returns to step 70.

As described above, in the present exemplary embodiment, the LED light source 36 emits light due to the drive current supplied from the LED driver section 32, the temperature sensor 34 measures the temperature of the surroundings of the LED light source 36, the light source current control section 30 decreases the drive current when the temperature that has been measured by the temperature sensor 34 becomes equal to or greater than the control start temperature, and, in a case in which the illuminance measurement value B of the surroundings of the vehicle that has been measured by the peripheral illuminance measurement sensor 12 is equal to or greater than the day/night determination illuminance threshold Bth, the control start temperature is made to be lower than in a case in which the illuminance measurement value B of the surroundings of the vehicle is less than the day/night determination illuminance threshold Bth. Consequently, thermal degradation of the LED light source 36 and peripheral components thereof can be suppressed.

Further, in the present exemplary embodiment, the peripheral illuminance measurement sensor 12 is an illuminance sensor or a camera that is provided at the vehicle. Consequently, additional cost that is required in order to install the vehicle lamp system 10 according to the present exemplary embodiment at the vehicle can be reduced.

Further, in the present exemplary embodiment, the day/night determination section 20 determines whether or not the illuminance measurement value B of the surroundings of the vehicle that has been measured by the peripheral illuminance measurement sensor 12 is equal to or greater than the day/night determination illuminance threshold Bth that is stored in the storage section 16, and provides notification of the determination result to the light source current control section 30, and the day/night determination illuminance threshold Bth that is stored in the storage section 16 is set according to the destination of the vehicle when the vehicle is shipped. Consequently, it can be accurately discriminated as to whether or not an environment at the surroundings of the vehicle is an environment in which the LED light source 36 and the peripheral members thereof become thermally severe and the control start temperature should be lowered.

Further, in the present exemplary embodiment, the vehicle ECU 14 that performs auto light control to turn on and off the headlamps of the vehicle according to the illuminance measurement value B of the surroundings of the vehicle is also made to function as the day/night determination section 20. Consequently, additional cost that is required in order to install the vehicle lamp system 10 according to the present exemplary embodiment at the vehicle can be reduced.

It should be noted that, in the above-described exemplary embodiment, explanation has been given regarding an aspect in which the vehicle lamp system 10 according to the exemplary embodiment is provided at a vehicle that is installed with functionality to perform auto light control to turn on and off the headlamps of the vehicle according to the illuminance of the surroundings of the vehicle. However, the present disclosure is not limited thereto, and can also be applied to a vehicle that is not installed with functionality to perform auto light control.

Figure 5:
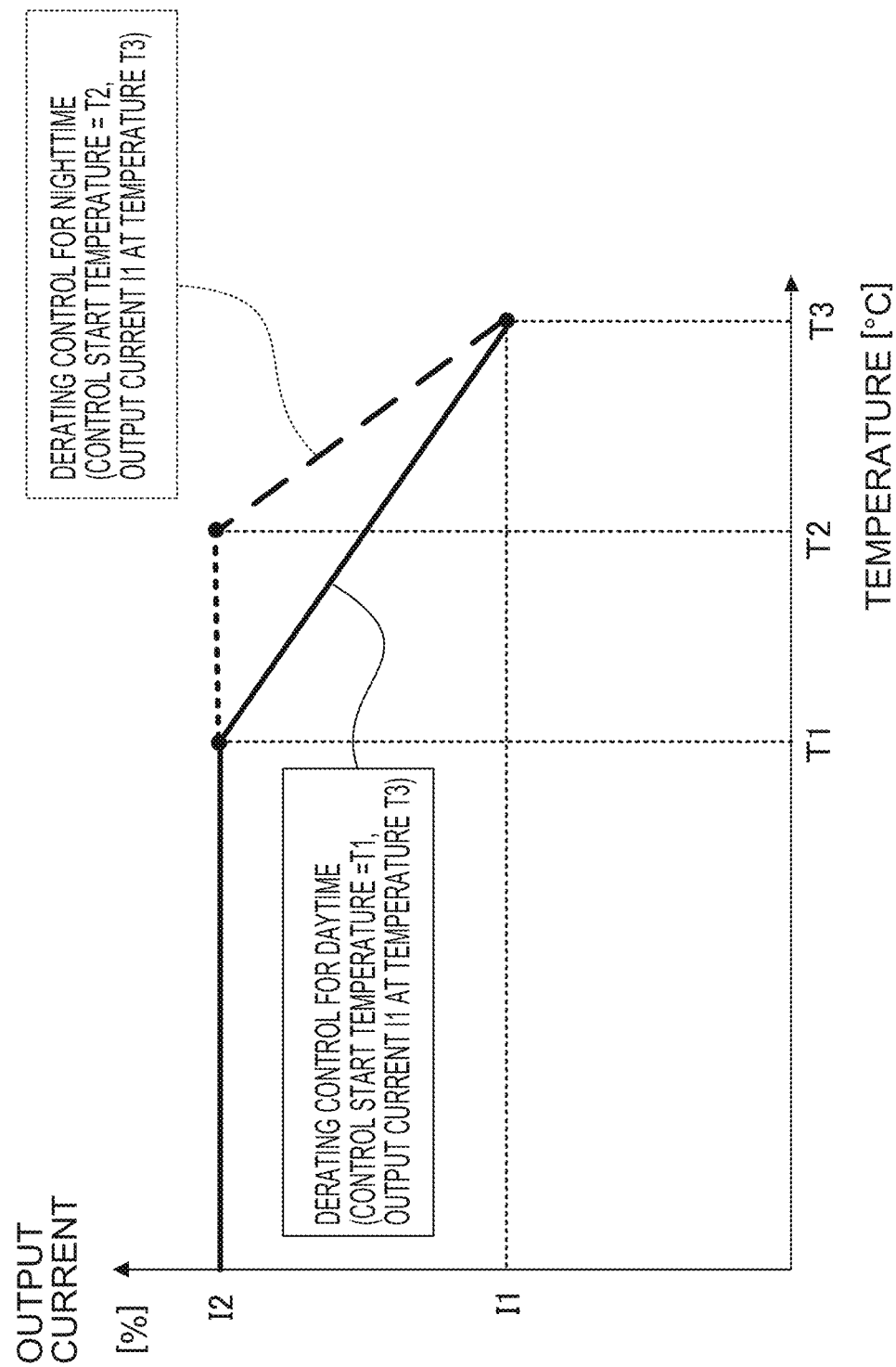
FIG. 5 is a diagram illustrating another example of a relationship between a light source temperature and an output current.

Further, in the above-described exemplary embodiment, explanation has been given regarding an aspect in which, as illustrated in FIG. 4, a slope of a change in the output current to the LED light source 36 with respect to a change in the substrate temperature T in the derating control for daytime is set to be the same as a slope of a change in the output current to the LED light source 36 with respect to a change in the substrate temperature T in the derating control for nighttime. However, the present disclosure is not limited thereto, and, for example, as illustrated in FIG. 5, the slope of the change in the output current to the LED light source 36 with respect to the change in the substrate temperature T in the derating control for daytime may be set to be smaller than the slope of the change in the output current to the LED light source 36 with respect to the change in the substrate temperature T in the derating control for nighttime. Further, in the derating control for daytime, the output current to the LED light source 36 may be made to change in a non-linear manner with respect to the change in the substrate temperature T.

Further, although explanation has been given regarding an aspect in which a signal line for transmitting the on/off instruction information and a signal line for transmitting the day/night determination information are respectively provided between the vehicle ECU 14 and the light source drive circuit 24 in the above-described exemplary embodiment, the present disclosure is not limited thereto. For example, the illuminance threshold for switching on/off of the LED light source 36 in the auto light control may be the same value as the day/night determination illuminance threshold Bth that is used in the day/night determination in the present disclosure, and in that case, the signal lines between the vehicle ECU 14 and the light source drive circuit 24 can be consolidated into a single line.

Further, although explanation has been given regarding an aspect in which the day/night determination illuminance threshold Bth that is stored in the storage section 16 when the vehicle is shipped is used in the above-described exemplary embodiment, the present disclosure is not limited thereto, and a configuration may be provided in which the illuminance threshold that is used in the day/night determination is automatically switched according to a current position (for example, a latitude of the current position or the like) of the vehicle.

In a case in which the derating control is activated at night, an amount of light of a luminous flux emitted from a headlamp or the like is reduced, resulting in deterioration of a forward field of view. For this reason, a control start temperature of the derating control needs to be set at a high predetermined temperature so as not to be reached at night time. However, in this case, even during daytime when the temperature becomes high and the environment becomes thermally severe due to the influence of solar radiation, as long as the temperature does not rise to the predetermined temperature, the derating control will not be activated, resulting in thermal degradation of the light emitting element and peripheral components thereof. Moreover, if heat dissipation measures and heat resistance measures are implemented in order to avoid thermal degradation, this results in an increase in cost of the vehicle lamp.

An object of the present disclosure is to obtain a vehicle lamp capable of suppressing thermal degradation of a light-emitting element and peripheral components thereof.

A first aspect of the present disclosure is a vehicle lamp that includes: a light source that emits light due to a drive current that is supplied from a light source drive circuit; and a temperature sensor that measures a temperature of the light source or surroundings of the light source, wherein the light source drive circuit reduces the drive current when the temperature that has been measured by the temperature sensor becomes equal to or greater than a control start temperature, and, in a case in which an illuminance of surroundings of a vehicle that has been measured by an illuminance measurement sensor is equal to or greater than an illuminance threshold, the control start temperature is set to be lower than in a case in which the illuminance of the surroundings of the vehicle is less than the illuminance threshold.

In the first aspect, when the temperature of the light source or the surroundings of the light source becomes equal to or greater than the control start temperature, derating control to reduce the drive current that is supplied from the light source drive circuit to the light source is activated. Further, in the first aspect, in a case in which the illuminance of the surroundings of the vehicle that has been measured by the illuminance measurement sensor is equal to or greater than the illuminance threshold, the control start temperature is set to be lower than in a case in which the illuminance of the surroundings of the vehicle is less than the illuminance threshold. Consequently, due to the derating control being started earlier during daytime when the light source and peripheral members thereof are in a thermally severe environment, the temperature of the light source and the peripheral members thereof can be kept low, and therefore, thermal degradation of the light source and peripheral components thereof can be suppressed.

A second aspect of the present disclosure is the vehicle lamp according to the first aspect, wherein the illuminance measurement sensor is an illuminance sensor or a camera that is provided at the vehicle.

An illuminance sensor is generally provided at a vehicle in order to perform auto light control to turn on and off headlamps of the vehicle according to an illuminance of surroundings of the vehicle, and a camera is generally provided at a vehicle in order to image the surroundings of the vehicle. In the second aspect, by using such an illuminance sensor or camera as the illuminance measurement sensor, additional cost that is required in order to install the vehicle lamp according to the present disclosure at the vehicle can be reduced.

A third aspect of the present disclosure is the vehicle lamp according to the first aspect, that further includes a processor that determines whether or not the illuminance of the surroundings of the vehicle that has been measured by the illuminance measurement sensor is equal to or greater than an illuminance threshold that is stored in a memory, and that provides notification of a determination result to a control section, wherein the illuminance threshold that is stored in the memory is set according to a destination of the vehicle when the vehicle is shipped.

Brightness of surroundings of a vehicle during daytime when a light source and peripheral members thereof are in a thermally severe environment differs depending on a region in which the vehicle is located. In response to this, in the third aspect, it is determined, by the processor, whether or not the illuminance of the surroundings of the vehicle is equal to or greater than the illuminance threshold, and the illuminance threshold is set according to the destination of the vehicle when the vehicle is shipped. Consequently, according to the third aspect, it can be accurately discriminated as to whether or not an environment at the surroundings of the vehicle is an environment in which the light source and the peripheral members thereof become thermally severe and the control start temperature should be lowered.

A fourth aspect of the present disclosure is the vehicle lamp according to the third aspect, wherein the processor is an ECU that performs auto light control to turn on and off headlamps of the vehicle according to the illuminance of the surroundings of the vehicle.

Generally, a vehicle is provided with an ECU that performs auto light control to turn on and off headlamps of the vehicle according to an illuminance of surroundings of the vehicle. In the fourth aspect, the processor is such an ECU, and therefore, additional cost that is required in order to install the vehicle lamp according to the present disclosure at the vehicle can be reduced.

According to the present disclosure, thermal degradation of a light source of a vehicle lamp and peripheral components thereof can be suppressed.

What is claimed is:

1. A vehicle lamp comprising:
   a light source that emits light due to a drive current that is supplied from a light source drive circuit; and
   a temperature sensor that measures a temperature of the light source or surroundings of the light source,
   wherein the light source drive circuit reduces the drive current when the temperature that has been measured by the temperature sensor becomes equal to or greater than a control start temperature, and, in a case in which an illuminance of surroundings of a vehicle that has been measured by an illuminance measurement sensor is equal to or greater than an illuminance threshold, the control start temperature is set to be lower than in a case in which the illuminance of the surroundings of the vehicle is less than the illuminance threshold.

2. The vehicle lamp according to claim 1, wherein the illuminance measurement sensor is an illuminance sensor or a camera that is provided at the vehicle.

3. The vehicle lamp according to claim 1, further comprising a processor that determines whether or not the illuminance of the surroundings of the vehicle that has been measured by the illuminance measurement sensor is equal to or greater than an illuminance threshold that is stored in a memory, and that provides notification of a determination result to a control section,
   wherein the illuminance threshold that is stored in the memory is set according to a destination of the vehicle when the vehicle is shipped.

4. The vehicle lamp according to claim 3, wherein the processor is an ECU that performs auto light control to turn on and off headlamps of the vehicle according to the illuminance of the surroundings of the vehicle.

* * * * *